United States Patent [19]
Clark

[11] Patent Number: 4,848,885
[45] Date of Patent: Jul. 18, 1989

[54] PREOBJECTIVE SCANNING SYSTEM
[75] Inventor: Peter P. Clark, Acton, Mass.
[73] Assignee: Polaroid Corporation, Cambridge, Mass.
[21] Appl. No.: 191,575
[22] Filed: May 9, 1988
[51] Int. Cl.⁴ .......................... G02B 9/34; G02B 26/10
[52] U.S. Cl. ...................................... 350/469; 350/6.7
[58] Field of Search ................ 350/469, 465, 6.7, 449, 350/450

[56] References Cited
U.S. PATENT DOCUMENTS
4,241,257 12/1980 Koester ................................. 350/6.7
4,497,546 5/1985 Kobayashi .......................... 350/469

Primary Examiner—Bruce Y. Arnold
Assistant Examiner—Rebecca D. Gass
Attorney, Agent, or Firm—Francis J. Caufield

[57] ABSTRACT

A preobjective scanning optical system for use with a rotating mirror scanner employing LEDs or lasers to electronically reproduce photographs. The optical system includes a doublet disposed before the mirror and a triplet disposed after the mirror. Instead of collimating, the first optical system along with the mirror forms a virtual, image of the LEDs or lasers which travels along a curved path as the scanner rotates and includes a first and a second lens which, in combination, correct the image for on-axis spherical and axial color aberrations. The triplet has net positive power and its three lenses, in combination, correct for off-axis aberrations such as astigmatism, coma, and lateral color aberration but can be under-corrected for field curvature because its object is the curved virtual image.

9 Claims, 2 Drawing Sheets

PREOBJECTIVE SCANNING SYSTEM

TECHNICAL FIELD OF THE INVENTION

The present invention relates to a preobjective scanning optical system and, in particular, to a preobjective scanning optical system for use in an apparatus for electronically reproducing photographs.

BACKGROUND OF THE INVENTION

Optical systems for imaging lasers or light emitting diodes (LEDs) onto photographic film to reproduce photographs from elecronically stored signals are well known. Such optical systems typically use a polygon mirror scanner which is rotated at a constant angular rate to scan a spot across a film to expose it in successive lines. However, if one focuses light reflected from the polygon mirror scanner with a "classical" lens where the image height is equal to the product of the focal length of the lens and the tangent of the angle the image makes with the optic axis, the spot speeds up as it travels further from the optic axis. This is unsuitable for a print system requiring equally spaced pixels written with data regularly spaced in time. Further, it is unsuitable for a print requiring a constant exposure level across such a scan line. As a result, in such systems, it is desirable to scan a spot across the film at a constant linear rate.

As is known in the art, these problems can be solved using a lens with a predetermined distortion in which the image height is equal to the product of the focal length of the lens and the angle the image makes with the optic axis rather than the tangent of that angle. Such lenses, known in the art as f-theta lenses, solve the problem because the tangent of the angle is always bigger than the angle itself. A further method of solving the above-identified problem is to control the rate of rotation of the polygon mirror scanner.

In addition to the above, there is a further consideration involved in designing an optical scanning system for a printer. That consideration relates to the placement of the objective lens which forms the focus of the lasers or LEDs on the film plane. These are normally classified as either preobjective or postobjective scanning systems depending on whether the polygon mirror scanner precedes or follows the spot-forming optics in the optical path. One is required to use a preobjective scanning optical system for printing on a film which is maintained in a flat plane. This is because the focus of the objective lens is on a curve if the polygon mirror scanner is disposed after the objective lens whereas the focus of the objective lens is in a flat plane if the polygon mirror scanner is disposed before the objective lens.

Notwithstanding the above, the requirement of a preobjective scanning optical system presents further problems in the design of an objective lens for such a system because the objective lens forms the final spot for the entire scan angle. In sum, these problems arise because the objective lens of the preobjective scanning optical system is reuired to: (1) have a flat field; (2) be anastigmatic; and (3) cover a wide field. Moreover, since the scanning mirror of a preobjective scanning system forms the effective aperture stop for the objective lens, the lens has to be designed for a remote stop. As a result of this, as one of ordinary skill in the art will readily appreciate, the objective lens cannot be symmetric about the stop. Consequently, principles of symmetry cannot be exploited to provide a measure of aberration control.

One approach to solving the above-identified problems in accordance with traditional design techniques found in the prior art includes designing the objective lens as an optical system comprising two parts, a collimator and an objective. However, this traditional approach presents a very difficult design problem because the objective has to be corrected for aberrations independent of the collimator. And, the control of these aberrations is more difficult in systems with a remote stop.

As a result, there is a need for a preobjective scanning optical system well-corrected for aberrations for use with an LED or laser printer or photographic system and which can operate with a remote stop. Further, it is preferable for such a system to have a linear scan rate on a plane, a fast relative aperture, and be of low cost and simple construction.

SUMMARY OF THE INVENTION

A preobjective scanning optical system fabricated in accordance with the present invention is well-corrected for aberrations and can operate with a remote stop.

The inventive preobjective scanning optical system advantageously comprises two optical systems disposed before and after, respectively, a scanning means, for example, a rotating mirror scanner. The first optical system, for example, a lens system, does not collimate. Instead, it preferably forms a virtual image of the LEDs or lasers as the polygon mirror scanner rotates. It is slightly positive but could also be negative depending on magnification and its contribution to the state of correction of the system as a whole.

The virtual image formed by the first optical system which, when scanned by the rotating mirror, travels along a curved path is then reimaged onto a flat, well-corrected plane by the second optical system, for example, a lens system, which is a positive optical system. In a preferred embodiment of the inventive preobjective scanning system, the first optical system is a doublet which comprises a first and a second lens which correct the image for on-axis aberrations, including spherical aberrations and axial color. More specifically, the doublet comprises a first negative element followed by a positive element, and the doublet has a net power which is slightly positive. Further, in the preferred embodiment of the inventive preobjective scanning system, the second positive optical system comprises three lenses which, in combination, correct mostly for off-axis aberrations, especially astigmatism, coma, and lateral color. More specifically, the second optical system is a triplet which comprises a first negative element followed by two positive elements. Advantageously, the second optical system does not have to correct for curvature of field because the object for that lens is the virtual, curved image formed by the first optical system.

As one of ordinary skill in the art can readily appreciate, embodiments of the present invention purposely deviate from having a collimated condition between the first and the second optical system. This advantageously permits the second optical system to deviate from having a flat field because, as the rotating mirror scanner rotates, it is scanning its object on a virtual curve. Further, and most advantageously, this is exactly the kind of field that is required for an optical system which is undercorrected for field curvature. Thus, as a consequence of this deviation from a requirement of strict collimation, one is able to relax the requirement for field curvature correction in the second optical system. Thus, the design of the second optical system emphasizes correction for astigmatism and other aberrations. This is beneficial because it is far easier to fabricate an anastigmatic optical system that does not have a flat field than one that has a flat field. Thus, the second optical system corrects for off-axis aberrations such as astigmatism and coma. In addition, the second optical system corrects for lateral color because there is nothing that can be done elsewhere to correct for this. In summary, correction of three off-axis aberrations, i.e., astigmatism, coma, and lateral color, are done in the second optical system and correction of all the axial aberrations, i.e., spherical aberration and axial color are done in the first optical system. Thus, the design of the second optical system need only correct for a subset of the aberrations while the remaining ones are corrected by the first optical system.

In addition to the above, the second optical system in the preferred embodiment has distortion which is substantially the same as an f-theta distortion over relatively small scan angles. As a result of this, the pixel size focused on the film plane remains constant over the scan line so that the exposure does not change across the film.

A further requirement for the above-described optical system is to have as much light as possible reach the film in an undistorted fashion, i.e., to make the optical system as fast as possible and, thereby, reduce the print speed as much as possible. This requirement is especially important when using LEDs because a typical LED does not have a very high light output. This requirement is satisfied by an asymmetric stop because it tolerates larger apertures in the plane perpendicular to the scan plane than apertures in the scan plane. The reason is that aberrations in the scan plane worsen more quickly with aperture in the scan plane than those which are out of the scan plane. In accordance with this, the inventive optical system utilizes a stop which has an elliptical shape. In a preferred embodiment of the present invention, the f-number in the scanning plane is f/7 and in the plane perpendicular to the scan plane is f/5.5. This is substantially lower than in typical laser printers available in the art which are typically much higher, for example, f/18 or higher.

BRIEF DESCRIPTION OF THE DRAWING

The present invention may be understood by considering the following detailed description together with the accompanying drawings, in which.

To facilitate understanding, the same reference numeral is used throughout the figures to designate an element.

DETAILED DESCRIPTION

Figure 1:
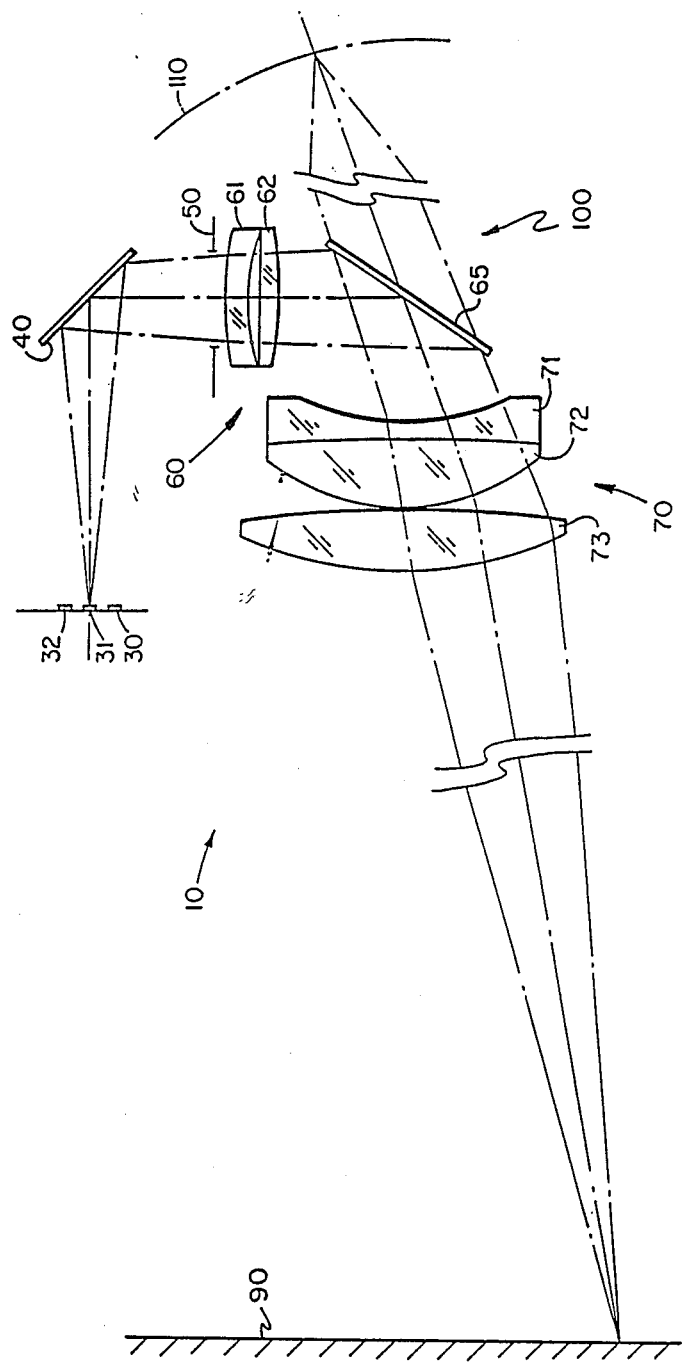
FIG. 1 shows a diagrammatic plan view of a preferred embodiment of the inventive preobjective scanning optical system.

FIG. 1 shows a plan view of a preferred embodiment of the inventive preobjective scanning optical system which is designated at 10. Red, green and blue LEDs 30-32 emit light which impinges upon folding mirror 40. Folding mirrors such as mirror 40 are not essential to the operation of the present invention but may be used, as is well known in the art, to achieve compactness. The light from LEDs 30-32, which is reflected from mirror 40, passes through an elliptical stop 50.

To have the system 10 as fast as possible, it is important to collect as much light from LEDs 30-32 as possible and to focus this light onto film plane 90. This requirement is important because a typical LED does not have a very high light output. Because there is more aberration introduced in the scan plane than in a plane perpendicular to the scan plane, stop 50 is made elliptical with its major axis perpendicular to the plane of the paper. For example, in one embodiment of the present invention, the f-number in the plane perpendicular to the scan plane is f/5.5 whereas the f-number in the scan plane is f/7.

The light which passes through elliptical stop 50 impinges upon optical system 60 which is comprised of a pair of lens elements 61 and 62, respectively, which comprise a doublet. Optical system 60 is designed to form a virtual image of LEDs 30-32 and to compensate for on-axis aberrations such as spherical aberration and axial color of the entire system 10. Lens 61 is negative while lens 62 is positive. Optical system 60 has an overall net power that is slightly positive, and is preferably itself corrected for coma over the field of the LEDs 30-32. However, it may even have negative power, depending upon magnification and its contribution to the state of correction of the overal optical system. The important property for purposes of this invention is that it not collimate.

The light which passes through optical system 60 impinges upon facet 65 of a scanning mirror, the rest of the scanning mirror is not shown for simplicity. The scanning mirror is rotated at a substantially constant angular velocity by means (not shown) which ar well-known to those of ordinary skill in the art. As scanning mirror 65 rotates, the virtual image formed by optical system 60 in conjunction with scanning mirror 65 moves in a curved path shown at 110. The light which is reflected from facet 65 impinges upon optical system 70 which is a triplet composed of lens elements 71, 72 and 73, respectively. Optical system 70 is designed to reimage the virtual image at 110, which is now its object, by focusing diverging rays from facet 65 as a spot on flat film plane 90. Optical system 70 is designed to correct for off-axis aberrations such as astigmatism, coma and lateral color. Still further, although optical system 60 may have a net positive or negative power, optical system 70 must have a net positive optical power. As shown in FIG. 1, lens 71 is a slightly negative element; lens 72 is a positive element; and lens 73 is a positive element, all of which are rotationally symmetric.

The light which passes through optical system 70 is focused to a spot on flat film plane 90. It is well known to those of ordinary skill in the art that the spot is scanned across the film plane as facet 65 rotates about the mirror axis (not shown). Still further, it is also well known to those of ordinary skill in the art that one can move the film in a direct perpendicular to the scan direction in order to provide for exposing an entire film.

Figure 2:
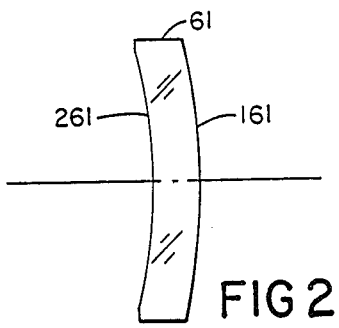
FIGS. 2-6 show elevations of the five lenses, respectively, which comprise the preferred embodiment of the inventive preobjective scanning optical system.
Figure 3:
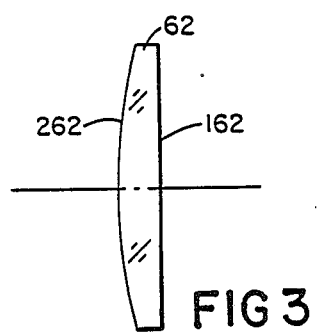
Figure 4:
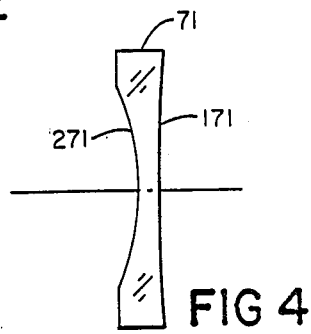
Figure 5:
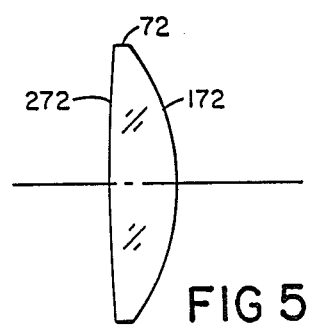
Figure 6:
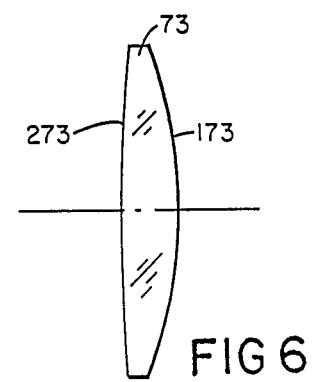

It is well known to those of ordinary skill in the art of lens design how to make specific design choices in accordance with the present invention to fabricate embodiments of the present invention. However, FIGS. 2-6 show elevations of the five lenses, respectively, which comprise a preferred embodiment 10 of the inventive preobjective scanning optical system. FIG. 2 shows lens 61; FIG. 3 shows lens 62; FIG. 4 shows lens 71; FIG. 5 shows lens 72; and FIG. 6 shows lens 73.

In the preferred embodiment shown in FIG. 2, lens 61 is formed from glass having an index of refraction approximately equal to 1.5168; surfaces 161 and 261 have radii of curvature approximately equal to 2.32 in. convex and 1.518 in. concave, respectively; and the central thickness is approximately 0.15 in.

In the preferred embodiment shown in FIG. 3, lens 62 is formed from glass having an index of refraction approximately equal to 1.5955; surfaces 162 and 262 have radii of curvature approximately equal to infinity and 1.9198 in. convex, respectively; and the central thickness is approximately 0.15 in.

In the preferred embodiment shown in FIG. 4, lens 71 is formed from glass having an index of refraction approximately equal to 1.7174; surfaces 171 and 271 have radii of curvature approximately equal to 1.6048 in. concave and 11.299 in. concave, respectively; and the central thickness is approximately 0.125 in.

In the preferred embodiment shown in FIG. 5, lens 72 is formed from glass having an index of refraction approximately equal to 1.5168; surfaces 172 and 272 have radii of curvature approximately equal to 11.299 in. convex and 1.44 in. convex, respectively; and the central thickness is approximately 0.45 in.

In the preferred embodiment shown in FIG. 6, lens 73 is formed from glass having an index of refraction approximately equal to 1.5168; surfaces 173 and 273 have radii of curvature approximately equal to 8.1737 in. convex and 2.726 in. convex, respectively; and the central thickness is approximately 0.40 in.

In the above-described embodiment, the elliptical stop 50 is close to surface 161 of lens 61.

Clearly, those skilled in the art recognize that further embodiments of the present invention may be made without departing from its teachings. For example, the optical path between triplet 70 and film plane 90 can be folded with additional mirrors to achieve further compactness. Therefore, it is intended that all matter contained in the above description or shown in the accompanying drawings shall be interpreted as illustative and not limiting.

What is claimed is:

1. A preobjective optical system for use with scanning means to scan a line with a focused image of light from a stationary source, said preobjective scanning optical system comprising:
   a first group of lenses disposed ahead of the scanning means for forming a virtual, image of the source which travels along a curved path as the scanning means rotates; and
   a second group of lenses of net positive power located after the scanning means and structured to focus said image into a straight scan line as the scanning means rotates.

2. The preobjective scanning optical system of claim 1 wherein said first
   group corrects for on-axis aberrations.

3. The preobjective scanning optical system of claim 1 wherein said first
   group corrects for on-axis spherical aberration and on-axis axial color.

4. The preobjective scanning optical system of claim 1 wherein said second
   group corrects for off-axis aberrations.

5. The preobjective scanning optical system of claim 1 wherein said second
   group corrects for astigmatism, coma, and lateral color.

6. The preobjective scanning optical system of claim 5 wherein:
   said first group comprises a doublet wherein the first lens is a negative element and the second lens is a positive element, and the doublet has a net positive power and is itself corrected for coma over the field of the light source(s); and
   said second group comprises a triplet having a first lens that is a negative and second and third lenses that are positive.

7. The preobjective scanning optical system of claim 6 which further comprises a stop disposed before the scanning means.

8. The preobjective scanning optical system of claim 7 in which said stop has a larger opening perpendicular to the scanning direction than its opening in the scanning direction.

9. The preobjective scanning optical system of claim 8 wherein said stop has a substantially elliptical shape.

* * * * *